United States Patent [19]
Lawford et al.

[11] 3,850,037
[45] Nov. 26, 1974

[54] FLOW METER AND FUNCTION GENERATOR THEREFOR

[75] Inventors: Victor Nicholas Lawford, Pasadena; Richard Paul Granada, West Covina; Peter Elderton, Fountain Valley, all of Calif.

[73] Assignee: International Telephone and Telegraph Corporation, New York, N.Y.

[22] Filed: July 9, 1973

[21] Appl. No.: 377,200

[52] U.S. Cl. ............................... 73/205 R, 73/211
[51] Int. Cl. ............................................. G01p 5/14
[58] Field of Search ....... 73/205 R, 205 L, 211, 212, 73/213, 214; 235/151.34

[56] References Cited
UNITED STATES PATENTS

| | | | |
|---|---|---|---|
| 2,970,476 | 2/1961 | Cary | 73/205 R |
| 2,992,559 | 7/1961 | Martz et al. | 73/205 R |
| 3,401,561 | 9/1968 | Cook | 73/205 R |

FOREIGN PATENTS OR APPLICATIONS

| | | | |
|---|---|---|---|
| 863,811 | 3/1961 | Great Britain | 73/211 |
| 385,257 | 11/1923 | Germany | 73/211 |

*Primary Examiner*—James J. Gill
*Attorney, Agent, or Firm*—A. Donald Stolzy

[57] ABSTRACT

A flowmeter and a function generator which may be employed separately or as an integral part of the flowmeter. A differential pressure unit (DPU) is connected to a pipeline on opposite sides of an orifice plate therein. The DPU produces an input shaft rotation directly proportional to the differential pressure. A linkage mechanism is then moved by the input shaft. The air relay produces an outlet air pressure which is substantially a curvilinear function (square root, for example) of the input shaft rotation. The curvilinear function is generated by the use of the linkage mechanism which includes plural fulcrums. These fulcrums are fixed to the air relay output shaft. A lever supported usually on each fulcrum in succession rocks on each successive fulcrum.

19 Claims, 15 Drawing Figures

3,850,037

FLOW METER AND FUNCTION GENERATOR THEREFOR

BACKGROUND OF THE INVENTION

This invention relates to mechanical apparatus, and more particularly, to mechanical function generators and/or systems such as flowmeter systems incorporating such function generators.

In the past, it has been the practice to connect the outlet of an air relay to a pressure sensitive device and to rotate an input shaft in accordance with differential pressure. The magnitude of the pressure in the air relay outlet then varies directly proportionally to the input shaft rotation. Such apparatus is disclosed in U.S. Pat. No. 3,262,463.

The usefulness of prior art apparatus is limited because the air relay output is always linear with the input shaft rotation.

SUMMARY OF THE INVENTION

In accordance with the present invention, the above-described and other disadvantages of the prior art are overcome by providing an output which is a substantially curvilinear function of input displacement.

On outstanding feature of the present invention relates to the use of a pivoted lever and means providing plural fulcrums.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

The disclosure of this application in many respects may be identical to that of U.S. Pat. No. 3,262,463. However, reference may be made to the said U.S. Pat. No. 3,262,463 for some details not disclosed herein. For this reason, the said U.S. Pat. No. 3,262,463 is hereby incorporated herein by this reference hereto as though fully set forth herein hereat.

Figure 1:
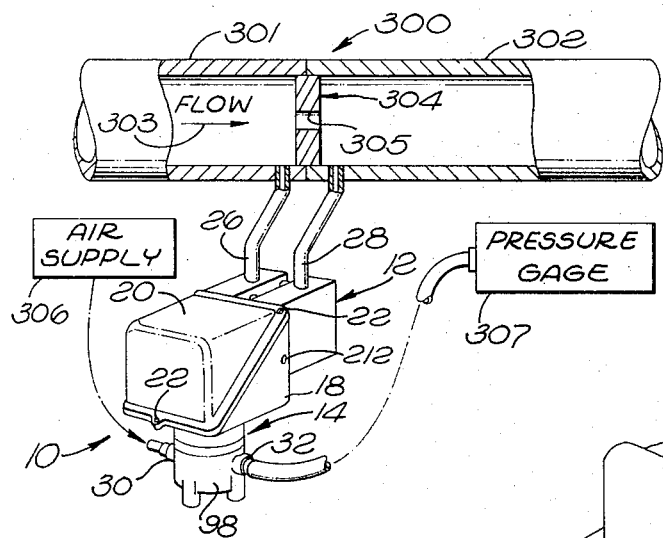
FIG. 1 is a perspective view of a flowmeter constructed in accordance with the present invention.

A flowmeter is illustrated in FIG. 1 including a pipeline 300 having sections 301 and 302 sealed together to form a single continuous conduit.

Pipeline 300 is employed to receive fluid flowing in a direction indicated by an arrow 303. A plate 304 is sealed inside pipeline 300 and has an orifice 305 through which fluid flows from the left-hand side of plate 304 to the right-hand side thereof.

The apparatus shown below pipeline 300 in FIG. 1 may be called a transmitter generally designated by an arrow 10.

Transmitter 10 includes a conventional differential pressure unit 12 which produces an output shaft rotation directly proportional to the difference between the pressures of the fluids which fill conduits illustrated at 26 and 28.

Conduit 26 is sealed through the wall of pipe section 301. Conduit 28 is sealed through the wall of pipe section 302.

In accordance with the foregoing, the fluid inside conduit 26 will have a pressure which exists in pipe section 301 on the upstream side of plate 304. The fluid in conduit 28 will then be at the pressure of the fluid inside pipe section 302 on the downstream side of plate 304.

Figure 2:
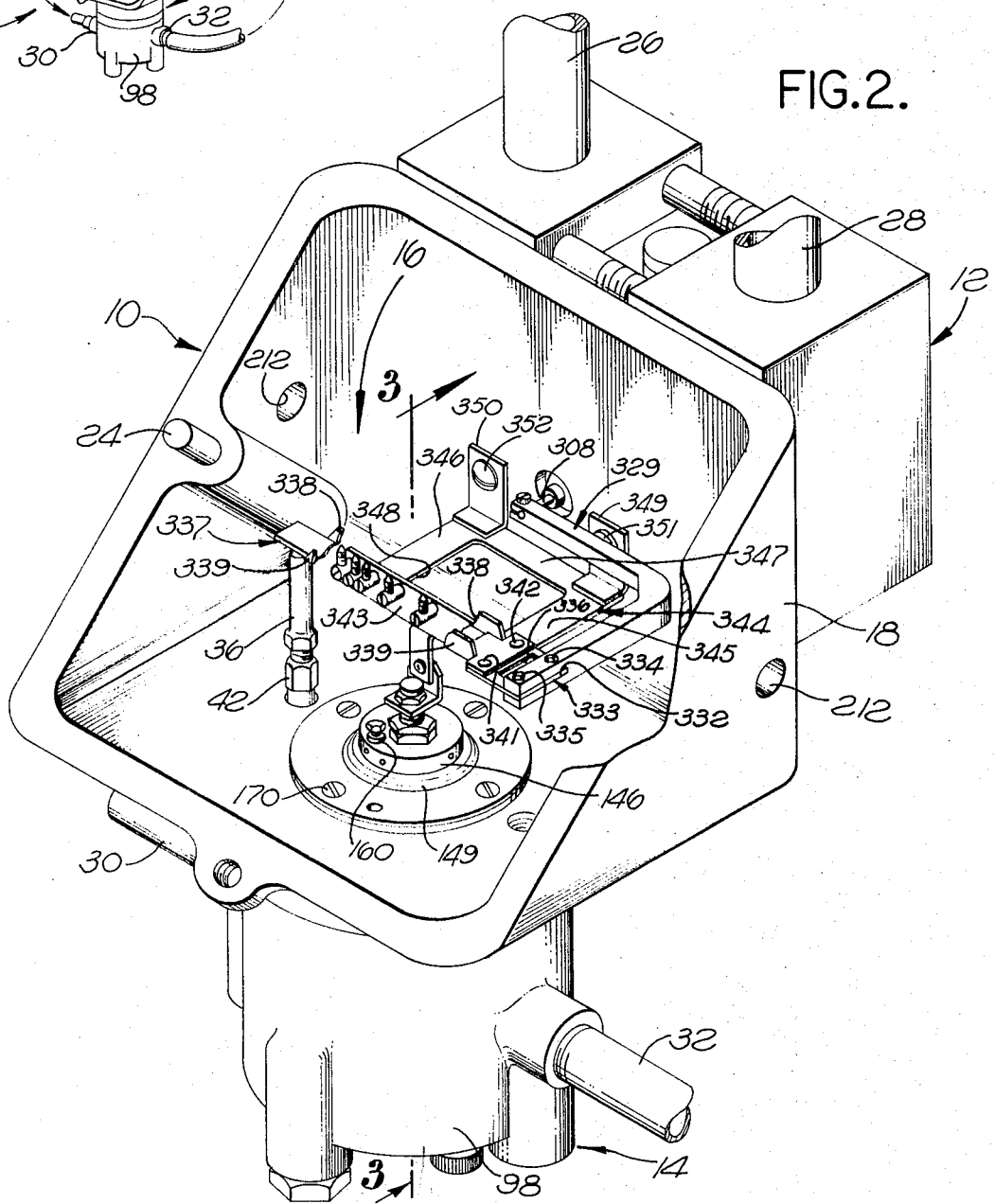
FIG. 2 is an enlarged broken away perspective view of a portion of the apparatus of FIG. 1 with an instrument housing cover removed.

Transmitter 10 also includes an air relay 14 and a control mechanism 16 shown in FIG. 2.

In both FIGS. 1 and 2, a case 18 is illustrated for housing the various parts of the control mechanism 16. The differential pressure unit (DPU) 12 and the air relay 14 are mounted on the case 18.

Case 18 has a cover 20 removably secured to its by screws 22, as shown in FIG. 1.

Centering pins 24 (see FIG. 2) may be provided, as shown. Centering pins 24 project from the inclined upper surface of the case 18 to facilitate proper placement of the cover 20 on case 18.

Case 18 has two ventilating bores that extend completely through respective walls thereof.

Input and output conduits 30 and 32 are connected respectively from an air supply 306 to air relay 14, and from air relay 14 to a pressure gauge 307. See FIGS. 1.

Supply 306 provides air at a constant pressure to air relay 14 through input conduit 30 thereof. Air relay 14, through the output conduit 32, provides air to pressure gauge 307 which varies with the flow rate of fluid flowing in the direction indicated by arrow 303 in FIG. 1.

Pressure gauge 307 may be an entirely conventional pressure gauge, if desired. Pressure gauge 307 may be calibrated in volume measure per unit time, if desired. For example, pressure gauge 307 may be calibrated, for example, in cubic feet per unit time or in gallons per minute.

OPERATION

In the operation of the flowmeter in FIG. 1, DPU 12 rotates an output shaft 308 shown in FIG. 2 in direct proportion to the pressure drop across orifice 305 shown in FIG. 1. Unfortunately, the pressure drop across orifice 35 is directly proportional to the square of the volume flow rate of the fluid inside pipeline 300. That is, the differential pressure is not a linear function of volume flow rate.

Figure 13:
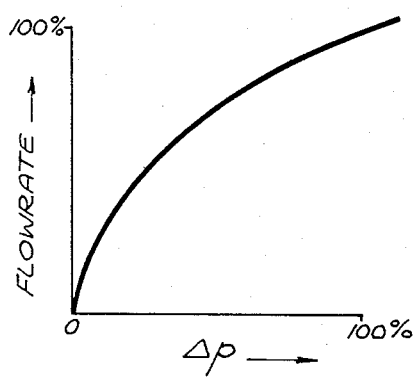
FIGS. 13 and 14 are curves characteristic of the operation of the present invention.

To explain the foregoing in some greater detail, the volume flow rate is the ordinant in FIG. 13. The abscissa is the pressure drop across orifice 305. In accordance with the present invention, control mechanism 16 straightens out the curve of FIG. 3 to a straight line shown in FIG. 14.

In FIG. 13, the flow rate ordinant is plotted as a percent of some predetermined maximum.

Figure 14:
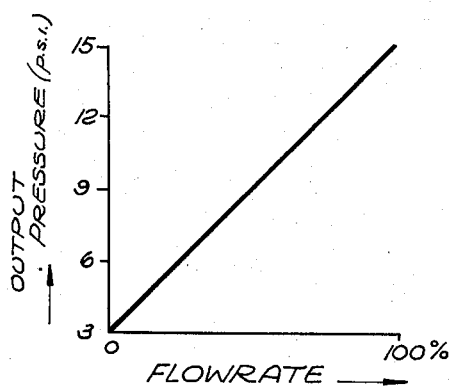

A typical range of 3 to 15 p.s.i. (pounds per square inch) output pressure in air relay output conduit 32 is illustrated in FIG. 14. The units of flow rate in FIG. 14 may be the same as those used in FIG. 13.

In FIGS. 13, $\Delta p$ may be plotted as a percent of some selected maxium pressure drop across orifice 305.

Figure 15:
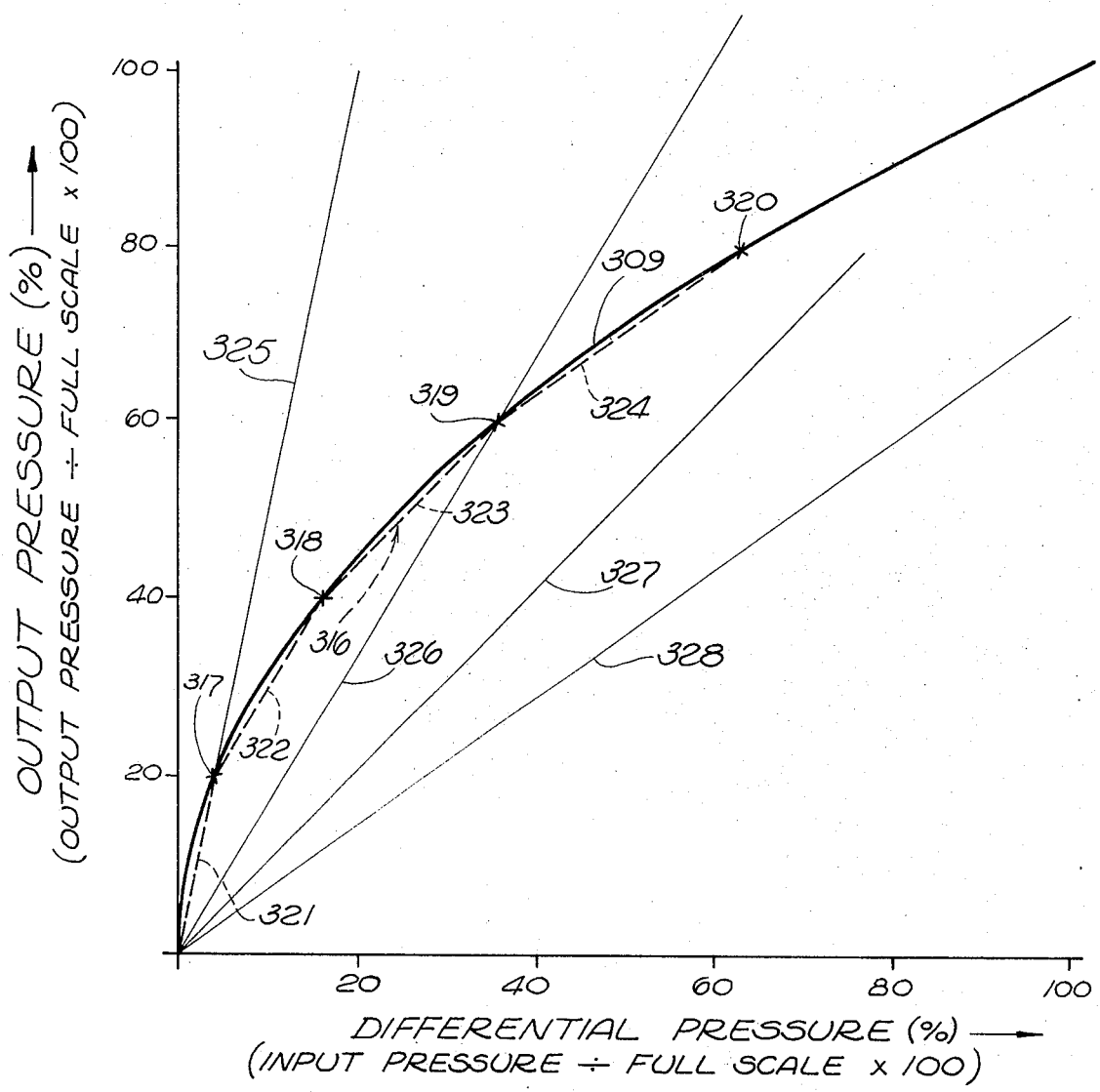
FIG. 15 is an enlarged view of an output pressure versus input differential pressure.

In FIG. 15, a curve 309 is illustrated, the ordinant being output pressure as a percent of full scale. The abscissa is differential pressure in percent, as before. In order to achieve the linear output of FIG. 14, the control mechanism 16 acts as a function generator which converts the nonlinear input on shaft 308, shown in FIG. 2, to a pressure in output conduit 32 of air relay 14 which varies in direct proportion to the flow rate. In other words, even though the input provided by shaft 308 is nonlinear with flow rate, the output is linear as shown in FIG. 14.

The curve of FIG. 14, in practice, is not perfectly linear, but the error between the actual output pressure and the stream line shown in FIG. 14 is negligible. Any maximum error may be reduced to any small magnitude as is desired. This can be done by increasing the number of fulcrums 310, 311, 312, 313, 314 and 315 shown in FIG. 3 as to as many as are needed. The use of these plural fulcrums causes the control mechanism 16 to follow curve 309 in an approximate fashion as illustrated by the dotted curve 316 which is only a piecewise continuous function of joined straight line segments. The pressure in air relay output conduit 32 is, in fact, linear with flow rate from time to time. The rate of change of the pressure in air relay output conduit 32 with respect to the rotation of shaft 308 changes at points 317, 318, 319 and 320, for example, as shown in FIG. 15. That is, point 317 is connected with 0, 0 by a dotted line segment 321 of "curve" 316. Similar dotted line segments 322, 323 and 324 are illustrated in FIG. 15.

The slopes of lines 325, 326, 327 and 328 are identical to the slopes of dotted line segments 321, 322, 323 and 324, respectively.

Figure 10:
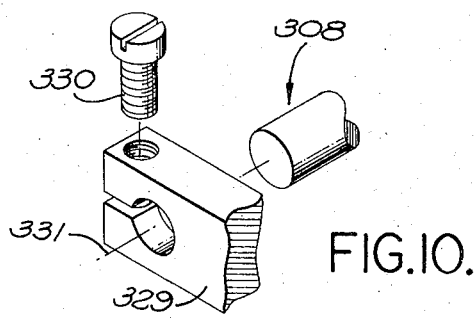
FIG. 10 is a broken away exploded perspective view of a differential pressure unit shaft connection.

As shown in FIG. 2, DPU 12 has an output shaft 308 which rotates through an angle of, for example, 8 degrees. The angle of shaft 308 is, for all practical purposes, directly proportional to the pressure drop across orifice 305. As shown in FIG. 10, shaft 308 is fixed to a member 329 by a set screw 330. If desired, the angular position of member 329 about the axis 331 of shaft 308 may be adjusted by loosening set screw 330, rotating member 329 about axis 331 and retightening set screw 330.

Member 329 is L-shaped, as shown in FIG. 2. Member 329 has a slot 332 in which a slotted leaf spring hinge 333 is clamped by screws 334 and 335. The slot of leaf spring 333 is illustrated at 336 in FIG. 2.

A lever 337 is effectively pivoted about the hinge axis of hinge 333 from member 329. Lever 337 is substantially rigid or stiff along most of the length thereof because it is made in the shape of a U-shaped channel having sides 338 and 339. Most of the channel 337 has been broken away in FIG. 2 to illustrate other structures in that view.

Figure 3:
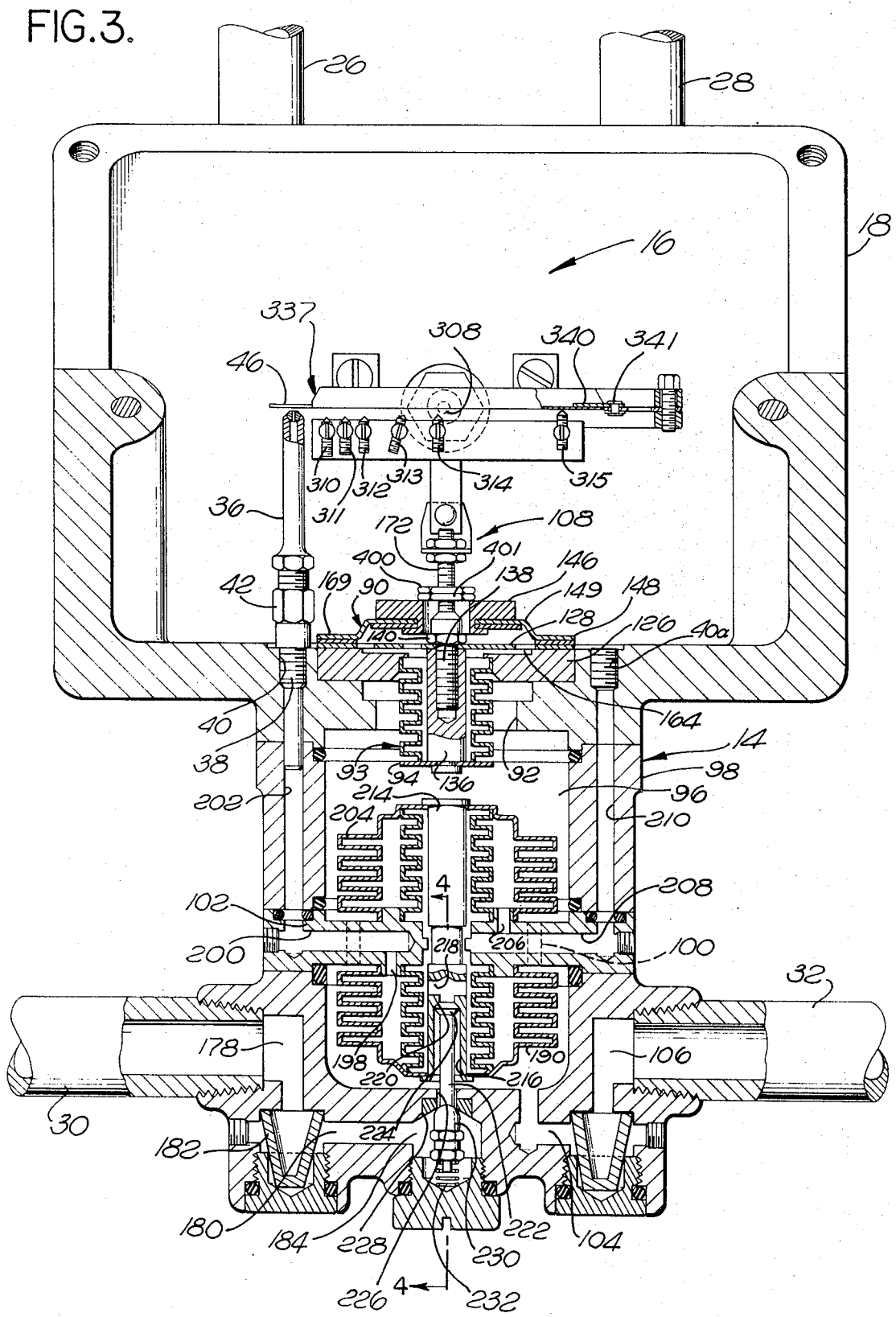
FIG. 3 is a vertical sectional view, partly in elevation, of the apparatus shown in FIG. 2.

A connecting link 340 is fixed to the bottom of channel 337, as shown in FIG. 3. Link 340 is fixed to hinge 333 by rivets 341 and 342 shown in FIGS. 2 and 3.

As shown in FIG. 3, at various positions of shaft 308, lever 337 will engage different ones of the fulcrums 310–315, inclusive.

When lever 337 is in a horizontal position as shown in FIG. 3, DPU output shaft 308, shown in FIG. 3, will have rotated as far in a clockwise direction, as viewed in FIG. 3, as it should.

When DPU output shaft 308, shown in FIG. 3, then rotates counterclockwise, as viewed in FIG. 3, lever 337 will rotate counterclockwise about whichever fulcrum point it engages.

When lever 337 is in the position shown in FIG. 3, there will always be some very small, yet finite, space between the upper end of air nozzle 36 and a plate 46 integral with lever 337.

In effect, the apparatus shown in FIG. 2 rebalances. For example, if DPU output shaft 308 rotates in a counterclockwise direction, as viewed in FIG. 3, lever 337 will move closer to the upper end of nozzle 36. In this event, air relay 14 will move, by raising all of the fulcrums 310–315 in a vertical direction, as viewed in FIG. 3, until the same spacing is produced between the upper end of nozzle 36 and plate 46.

Much of the structure lever 337 in FIG. 3 may be identical to that shown in the aforesaid patent.

Figure 12:
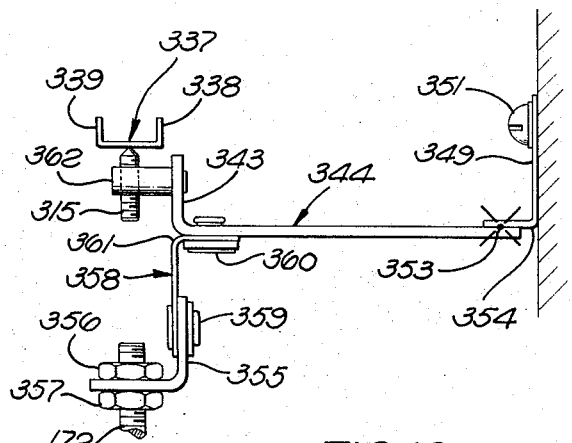
FIG. 12 is a broken away end elevational view of a portion of the apparatus shown in FIG. 2.

Each of the fulcrums 310–315, inclusive, may be mounted to a flange 343 of an otherwise, more or less, rectangularly-shaped member 344 shown in FIG. 12.

As shown in FIG. 2, flange 343 connects two legs 345 and 346 integral therewith. Flange 343 and sides 345 and 346, with a bight portion 347, define a rectangular hole 348. Brackets 349 and 350 are fixed to the interior back wall of case 18 by means of screws 351 and 352, respectively. See both FIGS. 2 and 12.

Bracket 349 is spot welded at 353 to the right end portion, as viewed in FIG. 2, of bight portion 347. See also FIG. 12. Bracket 350 may be spot welded to the left end of bight portion 347 in a manner substantially identical to the manner in which bracket 349 is spot welded thereto.

Brackets 349 and 350 provide leaf spring hinges 354 in FIG. 12 for member 344.

A shaft 172, which is fixed relative to a movable wall 94 of a repositioning bellows 93, is adjustably fixed relative to an L-shaped member 355 shown in FIG. 12 by means of nuts 356 and 357. Shaft 172 extends upwardly through a hole in member 355, not shown. Nuts 356 and 357 are threaded to shaft 172.

A bracket 358 is riveted to member 355 by a rivet 359. A rivet 360 connects bracket 358 to member 344.

Although the ends of bracket 358 are fixed relative to the corresponding members 344 and 355, brackets 358 provides a leaf spring hinge at 361.

As stated previously, the fulcrums 310–315 may be mounted from flange 343, shown in FIG. 12, in substantially the same manner even though each fulcrum may have a different location and orientation thereon. Due to the fact that the fulcrum mountings are similar, only the mounting of fulcrum 315 will be described in detail.

Figure 11:
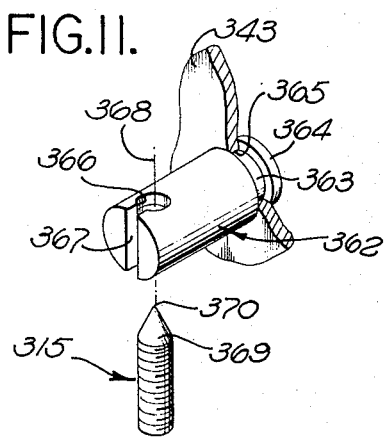
FIG. 11 is a broken away exploded perspective view of a fulcrum and fulcrum mounting means.

Fulcrum 315 is threaded in a diametral direction through a mounting shaft 362, as shown in FIG. 11. Shaft 362 has an end portion including a shaft 363 that is peened over at 364. Shaft 362 may be fixed relative to flange 343, or tightly rotatable in a circular hole 365 therethrough.

Fulcrum 315 is threaded through a bore 366 in shaft 362. The bore 366 and the thread of bore 366 preferably extend completely through shaft 362.

The outside diameter of shaft 363 is initially smaller than the inside diameter of a hole 365 so that shaft 363 may be assembled by inserting it through hole 365 without difficulty. At this time, shaft 362 may have a diameter, at its left end as viewed in FIG. 11, which is larger than the diameter of shaft 363. The larger diameter portion will then abut the principal surface of flange 343 which can be viewed in FIG. 11. Portion 364 of shaft 363 is then, at this time, of the same diameter as the smaller diameter portion thereof shown in FIG. 11. The portion 364 is then peened over.

Shaft 362 is slotted at 367. After bore 366 is threaded, the ends of shaft 362 in the vicinity of slot 367 are then crimped together. Thus, when fulcrum 315 is threaded through bore 366, it is held very tightly therein. In practice, fulcrum 315 may be fixed to or threaded tightly through bore 366. The lower end of fulcrum 315, shown in FIG. 11, may have an Allen head, not shown, for engagement therewith by an Allen head wrench, if desired.

When the ends of shaft 362 near slot 367 are crimped together, they need not touch or be crimped to a considerable extent, if desired.

The DPU 12 is constructed and arranged so that the output shaft 308 turns in the direction through a predetermined angle for the full range of differential pressure, e.g., 0 degrees to 8 degrees counterclockwise throughout a range of 0 to 100 inches w.c. (water column).

The nozzle 36, as shown in FIG. 3, is secured in a vertical position, as by threading its lower end 38 into a correspondingly threaded bore 40 in the bottom wall of the case 18. Vertical adjustment of the nozzle 36 can be achieved by simply varying the extent to which it is threadedly engaged in its bore 40. Locking of the nozzle 36 in adjusted position is effected by means of the lock nut 42 thereon, which is adapted to be screwed down into engagement with the bottom wall of the case 18.

Operatively associated with the nozzle 36 is a vane or plate 46 which functions to vary the restriction to air passage or escape from the nozzle 36. The plate 46 disposed in covering relationship with the nozzle 36. Variable restriction of the nozzle 36 is brought about by rocking the lever 337 slightly about one of the fulcrums 310–315, inclusive, to move the plate 46 toward and away from the nozzle 36.

The hinge 333 comprises a pair of substantially horizontal thin light flexure joints oriented approximately parallel to and spaced on opposite sides of a central vertical plane through lever 337 parallel to sides 338 and 339. Since the shaft 308 moves counterclockwise from its zero position of FIGS. 2 and 3, the lever 337 rocks downwardly during shaft rotation.

The fulcrum support flange 343 of FIG. 12 is mounted for limited vertical movement by the repositioning bellows assembly 90, shown in FIG. 3. To this end, the bellows assembly 90 is received in a bore 92 in the bottom wall of the case 18. The assembly 90 includes a bellows 93, which extends into the upper end of the housing of the relay 14. The bellows 93 is internally open to the atmosphere and has a movable end 94, which extends down through the bore 92 into a chamber 96 defined by the relay housing 98. The upper end of the bellows 93 is stationary. The interior of the chamber 96 is in fluid communication with the output conduit 32 of the relay, as through communicating outlet passages 104 and 106 in the lower end of the housing of the relay 14. Accordingly, the bellows 93 is subjected externally to transmitted pressure, so that its lower end 94 undergoes vertical movement to positions corresponding to the transmitted pressure.

The movable end 94 of the bellows 93 is connected to the lever 337 through shaft assembly 108, as stated previously. Thus, the movements of the inner end 94 of the bellows 93 are transmitted through the shaft assembly 108 to the lever 337, whereby the lever 337 is movable in response to changes in the transmitted pressure.

With the operative connection between the bellows assembly 90 and the flange 343 of FIG. 12, it will be understood that the result of bellows movement is to raise and lower the fulcrum end of member 344 and, hence, the fulcrums 310–315 responsive to changes in transmitted pressured.

As the flange 343 of FIG. 12 is moved upwardly due to increased transmitted pressure acting on the repositioning bellows 93, movement of plate 46 away from the nozzle 36 is at a progressively increasing rate.

The detailed construction of the repositioning bellows assembly 90 is illustrated in FIGS. 5 to 9, inclusive. An annular support 126 adapted to be secured to the case 18 serves to mount the various parts of the assembly. The bellows 93 has its upper end secured to the inner periphery of the support 126 and its movable end 94 projecting downwardly from the lower surface and adapted for movement toward and away therefrom.

Figure 5:
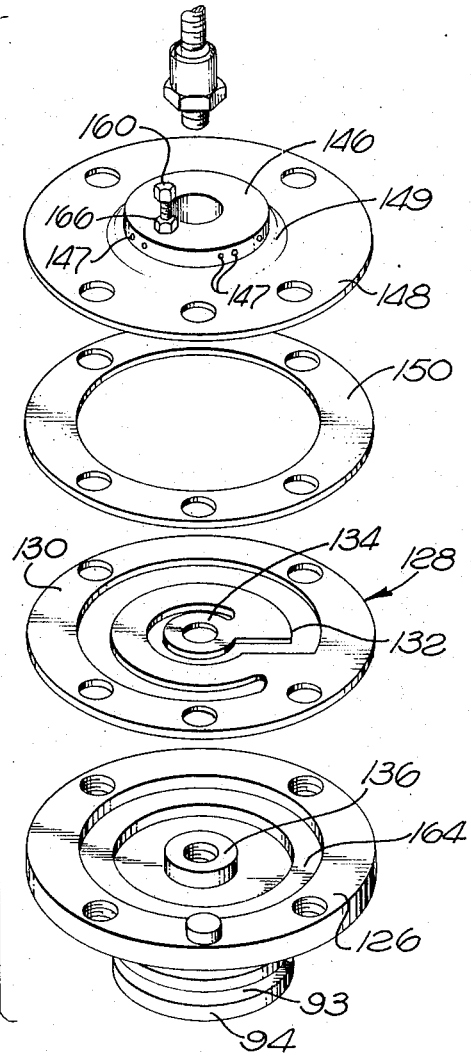
FIG. 5 is an exploded perspective view of a portion of the apparatus shown in FIGS. 1, 2, 3 and 4.
Figure 6:
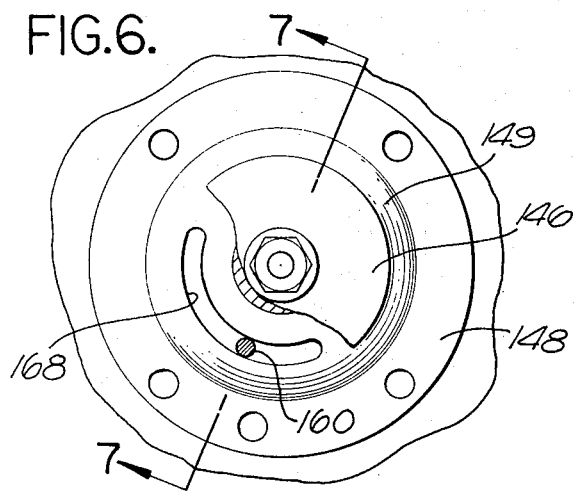
FIG. 6 is a broken away top plan view, partly in section, of apparatus shown in FIGS. 1, 2, 3, 4 and 5.
Figure 7:
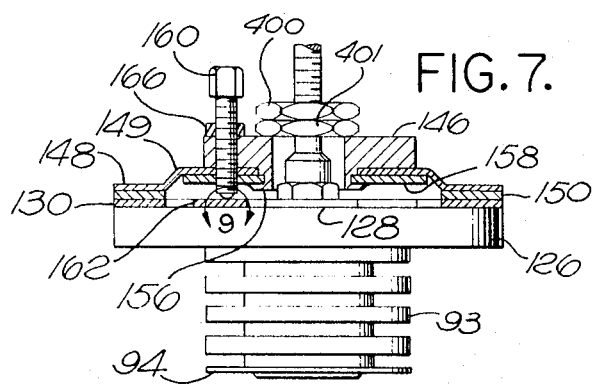
FIG. 7 is a vertical sectional view taken on the line 7—7 of the apparatus shown in FIG. 6.
Figure 8:
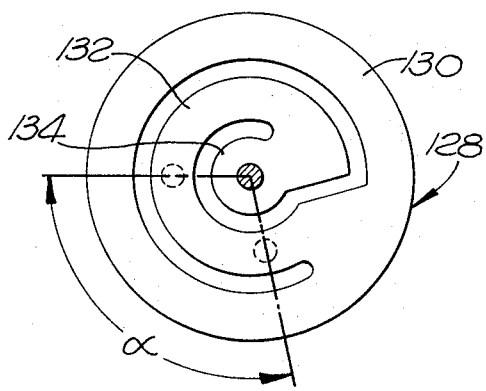
FIG. 8 is a top plan view of a spring also illustrated in FIG. 5.
Figure 9:
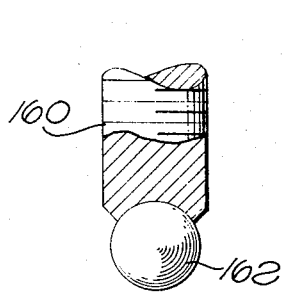
FIG. 9 is a partial sectional view on an enlarged scale of the area encircled by the line 9 in FIG. 7.

Movement of the lower end 94 of bellows 93 toward the lower surface of the support 126 is yieldably resisted by a disk spring 128. As best shown in FIGS. 2, 5 and 7, the spring 128 comprises a peripheral mounting ring 130 secured to the upper surface of the support 126, and a load member 132 that curves or spirals inwardly from the inner periphery of the ring 130 towards its center. The load member 132 terminates in a central mounting ring 134 adapted to be connected to the movable end 94 of the bellows. For such connection, a stem 136 is provided in the bellows 93 and has its lower end secured to the lower end 94 of the bellows. The stem 136 extends past the upper end of the bellows and is internally threaded to receive a threaded rod 138, as shown in FIG. 3. Rod 138 extends through the mounting ring 134. The rod 138 has a nut or flange 140 fixed to it at about its midpoint so that the rod can be threaded into the stem 136 until the flange 140 abuts the ring 134 and clamps it between the flange 140 and the stem 136.

The effective length of the spring 128 in its unrestrained condition is the distance along the curved load member 132 from the central mounting ring 134 out to the mounting ring 130. As is apparent, changing the effective length of a spring changes its rate or force per unit deflection. It is advantageous to be able to vary the spring rate of the spring 128, so as to enable the user to adjustably control the bellows action. To this end, adjustment means are provided which include an annular collar 146, at one end of which is a mounting flange 148 adapted to be secured to the upper surface of the support 126, the flange and the support 126 being separated by a spacer ring 150, as shown in FIG. 7. The flange 148 in FIG. 7 is clamped to the collar 146 in a manner to permit angular movement of the collar 146 relative to the flange 148 under frictional restraint. In this connection, the collar 146 seats on the top side of a central bulged portion 149 of the flange 146, and has a crown 156 that is pressed over against a washer 158 on the bottom side to clamp the central portion 149 therebetween. This clamping action not only maintains the collar 146 in assembly with the flange 148, but also frictionally restrains it against movement. To facilitate angular adjustment of the collar 146 with respect to the flange 148, the collar is provided with a plurality of radial bores 147 in its peripheral edge, as shown in FIG. 5, that are adapted to receive an appropriate tool. With the flange 148 held stationary, the collar can be turned by a force applied with such a tool that is great enough to overcome the frictional restraint.

Supported by the collar 146 and adapted for pressure engagement with the load member 132 of the spring for the purpose of varying its effective length is an adjustment screw 160. On the lower end of the screw 160, a ball 162 (FIG. 9) is provided for bearing against the load member 132 in the manner illustrated in FIGS. 6 and 7. With the ball 162 positioned in positive engagement with the load member 132, that portion of the member from the point of bearing outwardly to the mounting ring 130 is ineffective in yieldably resisting bellows movement. In other words, the effective length of the spring is the distance along the curved load member from the central ring 134 to the point of bearing, with that length being progressively shortened as the collar is rotated clockwise.

The screw 160 is made vertically adjustable in the collar 146 to insure that the ball 162 is in positive engagement with the load member 132, and also to preload the spring 128. In this latter regard, it may be seen in FIG. 5 that an annular recess 164 is provided in the upper surface of the support 126 to receive the load member 132, as it is depressed slightly during such preloading from its normal flat condition. Locking of the adjustment screw 160 in adjusted position on the collar 146 is effected by a lock nut 166 threaded on the adjusting screw 160, as shown in FIG. 7.

The adjustment range of the collar 146 in the present case is limited by the angular extent of a slot 168 (FIG. 6) in the central portion 149 of the mounting flange 148 through which the adjustment screw 160 extends. As shown diagrammatically in FIG. 8, the adjustment angle α is approximately 100 degrees in the present case. However, it is apparent that this adjustment range may be made greater or less, as desired, it being necessary only to make the slot 168 of the desired length and to insure that the ball 162 be aligned over the load member 132 for engaging it when the adjustment screw 160 is turned down. A highly advantageous feature of the spring adjustment means is that the spring rate may be altered without changing the initial position of the movable end 94 of the bellows 93.

To mount the bellows assembly 90 on the case 18, a counterbore 169 concentric with the bore 92 is sunk in the bottom wall. As shown in FIG. 3, the support 126 is received in the counterbore 169 with the bellows 93 extending down into the chamber 96 through the bore 92. A plurality of screws 170 (FIG. 2) extend through the mounting flange 148, the spacer ring 150, and the support 126, and are threaded into bores (not shown) in the case. The screws 170 serve the dual purpose of holding the various parts of the bellows assembly 90 together and of attaching the assembly to the case 18.

The shaft assembly 108, which, more or less, rigidly connects the bellows 93 to the flange 343 includes the upper screw shaft 172.

Figure 4:
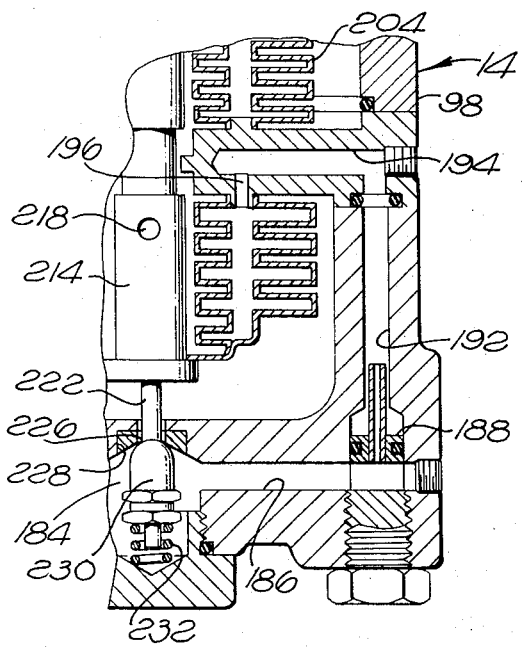
FIG. 4 is a broken away vertical sectional view, partly in elevation, taken on the line 4—4 of the apparatus shown in FIG. 3.

Before considering the operation of the transmitter, the construction and the mode of operation of the relay 14 will be examined. A relay of this type is also disclosed in U.S. Pat. No. 2,838,067. Referring to FIGS. 3 and 4, it will be seen that compressed air from the conduit 30 enters the relay 14 through passages 178 and 180, passing through a removable filter 182 at the junction of the passages 178 and 180 to a chamber 184. As shown in FIG. 4, a portion of this compressed air flows from the chamber 184 through a radially extending passage 186 to a restrictor 188. After passing through the restrictor, where its pressure is reduced, this air enters between a set of dual bellows 190 attached to the lower surface of the divider plate 102 through a series of communicating passages 192, 194 and 196.

The interior of the lower bellows 190, in turn, is fluid-connected to the nozzle 36 through passages 198, 200 and 202. Air from the bellows is thus bled through the nozzle 36 at a rate depending upon the action of plate 46. In other words, pilot or back pressure in the lower bellows 190 depends upon the flapper position.

Another set of dual bellows 204 is mounted on the upper side of the divider plate 102, these bellows 204 being substantially identical to the lower bellows 190. The interior of the upper bellows 204 is constantly vented to atmosphere through passages 206, 208 and 210. The threaded bore 40a is open at both ends and has no plug. When the cover 20 of the case 18 is in place, escape or entry of air from the case is effected through vent holes 212 (FIG. 1) in its side walls.

As previously explained, both upper and lower bellows 204 and 190 are externally subjected to transmitted pressure existing within the chamber 96. The upper and lower portions of the chamber 96 are in constant communication with one another through the vertical passages 100 in the divider plate 102. In addition, the chamber 96 is open to the outlet conduit 32 through passages 104 and 106.

To provide for movement of the bellows 190 and 204 in unison, a rigid stem 214 is connected between their movable ends. An axial bore 216 extends upwardly from the lower end of the stem 214 (FIG. 3), and at its upper end joins the transverse bore 218. A valve seat 220 is formed in the bore 216 adjacent its junction with the bore 218. A valve member 224 cooperable with the seat 220 is provided on the upper end of a valve stem 222, which is vertically movable relative to the relay housing 98. This member 224 is adapted to engage on the seat 220 to block communication between the bores 216 and 218. When the member 224 is moved off of its seat 220, air from the chamber 96 is allowed to escape to the atmosphere through the path provided by the bores 216 and 218 and the passages 208 and 210.

The valve stem 222 extends down through a bore 226 in the housing 98 which affords a passage between the valve chamber 184 and the chamber 96. A valve seat 228 is provided in the upper wall of the chamber 184 at the opening to the bore 226. Movable toward and away from the seat 228 is a valve member 230 secured to the lower end of the stem 222. The function of this valve member 230 is to throttle the main flow of air from the valve chamber 184 to the chamber 96. A compression spring 232 biases the valve member 230 and the member 224 toward their seats 228 and 220, respectively.

In light of this description of the relay construction, it will be understood that the pilot pressure in the lower bellows 190, which is determined by the restriction to the escape of air from the nozzle 36, controls relay operation. As the nozzle restriction is increased from an initial zero differential pressure condition, the pilot pressure builds up in the lower bellows 190, causing the same to expand downwardly, moving with them the upper bellows 204 by virtue of the connecting stem 214. Such downward movement of the stem 214, in turn, moves the valve stem 222 downwardly to force the valve member 230 away from its seat 228. Hence, the throttling of main flow from the valve chamber 184 to the chamber 96 decreases, and the chamber or transmitted pressure increases.

As restriction of the nozzle 36 by the plate 46 is subsequently decreased, the lower bellows 190 are permitted to contract back toward their neutral position, whereupon both bellows 190 and 204 and the connecting stem 214 move back toward their original positions. This action results in the valve member 224 cracking off its seat 220 to bleed off a small quantity of air to the atmosphere and relieve the excess chamber pressure. The relay 14 rapidly reaches a stable condition in which the valves 228 and 230 throttle the air flow to the chamber 96 to produce the proper transmitted pressure signal. In retrospect, increased nozzle restriction brings about a corresponding increase in transmitted pressure, whereas decreased restriction results in a decrease in transmitted pressure.

When a zero pressure differential is sensed by the DPU 12, its output shaft 308, of course, remains in its original position. The plate 46 then occupies approximately the restriction position illustrated in FIG. 3, wherein air is permitted to escape constantly at a low rate from the nozzle 36. The repositioning bellows 93 is very slightly compressed, and the valve member 230 is slightly off its seat 228, all in a manner whereby the transmitted pressure equals, for example, 3 p.s.i.

Upon a pressure differential larger than zero being sensed by the DPU 12, its output shaft 308 rotates. This, in turn, causes plate 46 to move downwardly as the lever 337 rocks about one fulcrum to further restrict the escape of air from the nozzle 36. As a consequence, the pilot pressure in the passages 198, 200 and 202 and within the lower bellows 190 increases. The bellows 190 are expanded downwardly under the influence of this pilot or triggering pressure, compressing the upper bellows 204, so as to increase the opening between the valve member 230 and its seat 228.

An increase in pressure within the chamber 96 immediately takes place upon such valve opening, causing the repositioning bellows 93 to be compressed. Bellows compression serves to raise the fulcrums 310-315. The plate 46 is thus pivoted or rocked on each fulcrum in succession, and the plate 46 is lifted slightly away from the nozzle 36 to reduce the restriction to escape of air. The end result is that a stabilized condition is quickly reached.

By way of example, should the differential pressure subsequently decrease, the output shaft 308 first rotates back. This causes member 329 to pivot in a clockwise direction as viewed in FIG. 3 (see also FIG. 2). Plate 46 then moves away from the nozzle 36. Pilot pressure is decreased on account of this reduced nozzle restriction, and the lower bellows 190 are permitted to contract back toward their original position. Such bellows' movement, in turn, causes the valve 224 to be cracked off its seat 220 to relieve excess chamber pressure to the atmosphere, as well as to permit the valve member 230 to close toward its seat 228 under the influence of the compression spring 232. Decreasing the transmitted pressure or pressure in the chamber 96 reduces the force applied to the movable end 94 of the repositioning bellows 93 so that the bellows expand downwardly into the chamber. Simultaneously, the flange 343 moves back, and the plate 46 moves back toward the nozzle 36 to slightly increase restriction. Again, a stabilized condition is reached. As the differential pressure sensed at the primary device providing inlet pressures to DPU 12 subsequently increases or decreases, the operation of the transmitter is the same as described above, with corresponding increases and decreases in the transmittal pressure signal being brought about.

Various independent means are provided in the control mechanism 16 for facilitating calibration of the transmitter. In this regard, the nozzle 36 is vertically adjustable to alter its position with respect to that of plate 46. Also, nut 140 may or may not be threaded to rod 138, as described. If so threaded, nut 140 may be rotated to raise and lower the position of flange 343 relative to bellows 93. These adjustments are normally made to correlate the zero or low differential pressure reading with the minimum transmitted pressure signal. Correlation of the high differential pressure reading with the maximum transmitted pressure signal can be achieved by rotation of the adjustment collar 146 on the bellows assembly 90 to vary the effective length of the spring 128 and, hence, the spring rate in the manner described in detail above.

Still another highly advantageous feature of the present transmitter, and one which renders it capable of being used in still other applications, is that it may be arranged for reverse action. That is, it may be arranged to transmit a 15 to 3 p.s.i. pressure signal for its 0 to 100 inch differential pressure range. To condition the transmitter for this reverse action, the nozzle 36 is simply removed from its bore 40 and screwed into the like bore 40a which communicates with the passage end portion of the bore 210. In addition, the relay 14 is detached from the case 18 and rotated 180 degrees so that the passage 210 communicates with the bore 40 and the passage 202 with the bore 40a. The member 329 is then released from the output shaft 308 and rotated 180 degrees so that plate 46 again cooperates with the end of the nozzle 36.

The phrase "means including at least two fulcrums" is hereby defined for use herein and for use in the claims to include, but not be limited to, at least two of the fulcrums 310–315, or the like, in any position on flange 343, or the like, or a cam, adjustable or not, on a support including, but not limited to, that of the type illustrated at 343 herein.

Note will be taken that, in FIG. 11, bore 366 has an axis 368 which is the same as that of fulcrum 315. If desired, the orientation of axis 368 may be adjusted with fulcrum 315 threaded in bore 366 by turning shaft 362 about the symmetrical axis of the cylindrical external surface of shaft 363.

Still further, the upper end of fulcrum 315 has a conical surface 369 which terminates in a point 370. The location of point 370, while fulcrum 315 is threaded through bore 366, may be adjusted relative to shaft 362 by turning fulcrum 315 with an Allen head wrench, as aforesaid.

For the square root function, fulcrums 310–315 may have orientations and elevations similar to that shown in FIG. 3. For example, all the fulcrums 310, 311, 312, 313 and 314 lie below fulcrum 315.

In accordance with the foregoing, the following relation is true:

$$\Delta p = kQ^2, \text{ and}$$
$$\Delta p = p_i - p_o$$

where, $p_i$ is the pressure inside pipeline 300 on the left-hand side of orifice plate 304 shown in FIG. 1, $p_o$ is the pressure inside pipeline 300 on the right-hand side of orifice plate 304, $Q$ is the volume rate of flow of fluid in pipeline 300, and $k$ is a constant.

The word "output" is hereby defined for use herein and for use in the claims as any output including, but not limited to, air, air pressure, an electrical signal or any other variable.

In accordance with the foregoing, it will be appreciated that the function $\Delta p = kQ^2$ may be produced by an conventional orifice or other device. Moreover, the control mechanism 16 may be employed to produce a squared, a square root or other function.

The phrase "utilization means" is hereby defined for use herein and for use in the claims to include, but not be limited to, an indicator, a recorder or a controller.

The word "hinge," as used herein and as used in claims, is hereby defined to include, but not be limited to, a door-type hinge or a leaf spring hinge.

The phrase "hinge axis" is hereby defined for use herein and for use in the claims to include, but not be limited to, the approximate hinge axis of a leaf spring hinge.

The word "fixed," as used herein and as used in the claims, is hereby defined to include the fixation between two structures with or without adjustability of one of such structures with respect to the other. For example, note will be taken that the fulcrums 310–315 may or may not have adjustability, as desired, but in any event, they are always fixed in position, during operation, relative to flange 343.

The word "distance," as used herein and as used in the claims, is hereby defined to include, but not be limited to, either angular or linear displacement.

The phrase "means to provide air at a constant pressure" is hereby defined for use herein and for use in the claims to include, but not be limited to, no more than means providing a passageway, a conduit or otherwise.

The following alternatively descriptive phrase is referred to hereinafter: "adaptive means mounting said fulcrum on said support means, said adaptive means being adjustable in a manner to move said fulcrum end portion with at least one component of the movement thereof normal to the length of said lever, and with at least another component of the movement thereof parallel to the length of said lever." The last quoted phrase is hereby defined for use herein and for use in the claims to have the following meaning.

The "component . . . normal" may or may not be the only such component in one mode of adjustment of the said "first means."

The "component . . . parallel" may or may not be the only such component in another mode of adjustment the same as or different from the said one mode.

The "adaptive means" may be any shaft 362, the threads of the same shaft 362 and the threads of a corresponding one of fulcrums 310–315.

The "fulcrum" may be any one of the fulcrums 310–315.

The "support means" may be flange 343, more or less. The fulcrum "end portion" may be the end point as at 370 in FIG. 11 or a portion of the conical surface at the upper end of one of the fulcrums 310–315.

What is claimed is:

1. A function generator comprising: a base; an input member movably mounted on said base; means actuable to move said input member in a first predetermined direction fixed relative to said base, said means being adapted to move said input member a distance which is an input function of a predetermined variable; an air relay fixed relative to said base, said air relay having an air exhaust nozzle fixed therewith and extending in a second predetermined direction relative thereto, said nozzle having an orifice to allow air to escape therefrom, said air relay having an output member movable in said second predetermined direction and in a direction opposite thereto; a lever; connection means mounting said lever on said input member in a manner such that movement of said input member in said first direction and in a direction opposite thereto causes the flow rate of the air vented through said nozzle orifice to decrease and to increase, respectively, by moving said lever respectively toward and away from said nozzle orifice, movement of said lever toward said orifice causing said output member to move in a direction opposite the direction of movement of said lever, movement of said lever away from said orifice again causing said output member to move in a direction opposite to the direction of movement of said lever; and means including a plurality of fulcrums mounted on said output member, said lever being mounted on said input member in a manner such that said lever is held against one of said fulcrums over one portion of the range of movement of said input member, and is held against another of said fulcrums over a second portion of the range of movement of said input member, said one portion of the range being different from the said other portion thereof, said air relay having an air inlet to receive air at a constant pressure, and an air outlet, the one and the other of said fulcrums having a spacing and locations on said output member such that when air of a constant pressure is supplied to the air inlet of said air relay, the pressure in the outlet of said air relay is substantially a curvilinear function of said input member movement.

2. The invention as defined in claim 1, wherein said input member is rotatable about an axis and through an angle which is said input function, said lever having a first portion adjacent said nozzle orifice to move toward and away therefrom.

3. The invention as defined in claim 2, wherein said nozzle has an axis which extends approximately in said second direction, said nozzle axis lying approximately in a plane normal to said input member axis of rotation.

4. The invention as defined in claim 3, wherein said lever first portion has a substantially planar surface, said lever surface lying approximately in a plane which passes through said input member axis of rotation at least at one of the extreme limits of the range of rotation of said input member.

5. The invention as defined in claim 4, wherein said lever first portion is located at one end thereof, said connection means including rotational means connected between the other end of said lever and said input member to hinge said lever from said input member to rotate relative thereto about an axis parallel to said input member axis of rotation.

6. The invention as defined in claim 5, wherein said rotational means includes a leaf spring hinge, said leaf spring hinge being more flexible than said lever.

7. The invention as defined in claim 6, including means to provide air under a constant pressure to said air relay air inlet, utilization means, and passageway means connecting said air relay air outlet to said utilization means.

8. The invention as defined in claim 7, wherein said utilization means includes a pressure gauge calibrated in volume measure per unit time, a differential pressure unit adapted for connection to two opposite sides of a plate having an orifice and being located in a pipeline, said variable of said input function being the difference between the pressures across said orifice plate, said air relay having a pressure in the said outlet thereof directly proportional to the square root of said input member rotation.

9. The invention as defined in claim 8, wherein said input member axis is located between said hinge axis and a line normal to said nozzle axis in the plane of said hinge and input member axes.

10. The invention as defined in claim 2, wherein said lever first portion has a substantially planar surface, said lever surface lying approximately in a plane which passes through said input member axis of rotation at least at one of the extreme limits of the range of rotation of said input member.

11. The invention as defined in claim 10, wherein said input member axis is located between said hinge axis and a line normal to said nozzle axis in the plane of said hinge and input member axes.

12. The invention as defined in claim 11, wherein said rotational means includes a leaf spring hinge, said leaf spring hinge being more flexible than said lever.

13. The invention as defined in claim 2, wherein said lever first portion is located at one end thereof, said connection means including rotational means connected between the other end of said lever and said input member to hinge said lever from said input member to rotate relative thereto about an axis parallel to said input member axis of rotation.

14. The invention as defined in claim 13, wherein said rotational means includes a leaf spring hinge, said leaf spring hinge being more flexible than said lever.

15. The invention as defined in claim 1, including means to provide air under a constant pressure to said air relay air inlet, utilization means, and passageway means connecting said air relay air outlet to said utilization means.

16. The invention was defined in claim 15, wherein said utilization means includes a pressure gauge calibrated in volume measure per unit time, a differential pressure unit adapted for connection to two opposite sides of a plate having an orifice and being located in a pipeline, said variable of said input function being the difference between the pressures across said orifice plate, said air relay having a pressure in the said outlet thereof directly proportional to the square root of said input member movement.

17. The invention as defined in claim 1, wherein the individual positions of a plurality of said fulcrums are adjustable relative to said output member.

18. The invention as defined in claim 17, wherein each adjustable fulcrum is adjustable in two different directions.

19. The invention as defined in claim 18, wherein said nozzle orifice has an axis, a shaft being rotatably mounted about an axis on said output member for each adjustable fulcrum, each adjustable fulcrum being rotatably threaded through each corresponding shaft on a predetermined thread axis normal to each corresponding shaft axis, all of said shaft axes lying parallel to each other, all of said shaft axes lying normal to a plane through said nozzle orifice axis.

* * * * *